Patented Jan. 12, 1943

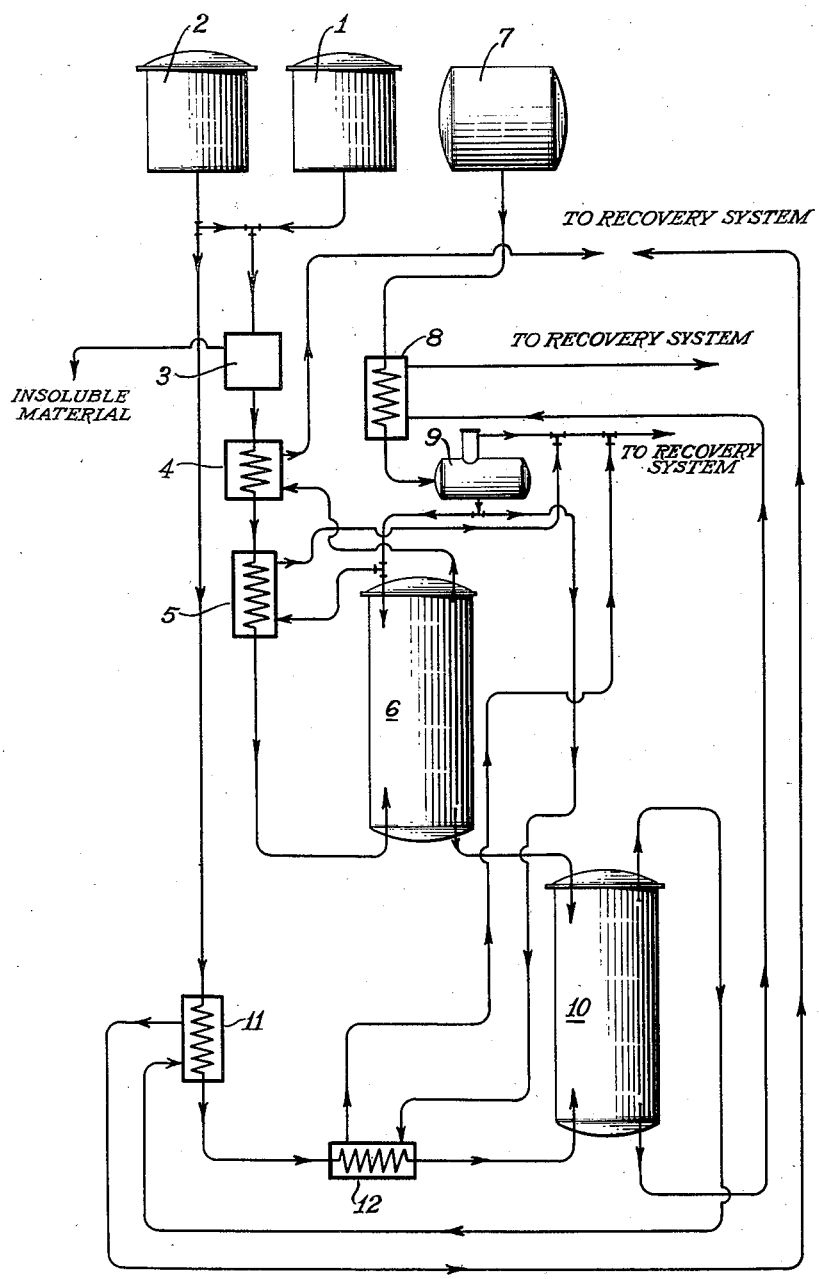

2,308,431

UNITED STATES PATENT OFFICE 2,308,431

PURIFICATION OF ORGANIC MATERIALS

Robert Louis Brandt, New York, N. Y., assignor to Colgate-Palmolive-Peet Company, Jersey City, N. J., a corporation of Delaware Application January 13, 1940, Serial No. 313,722

5 Claims. (Cl. 260—97.5)

This invention relates to a process of treating fatty acid compositions, particularly tall oil, in order to improve the odor, color, color-stability and other physical and chemical properties thereof.

It is an object of this invention to purify fatty acid compositions by means of liquid sulphur dioxide. It is also an object of this invention to extract a solution of fatty acids in one solvent with another solvent substantially immiscible with the fatty acid solution, one of the solvents being liquid sulphur dioxide.

The present invention particularly provides a process for the production of uniform fatty acid materials of relatively good odor, color and other physical and chemical properties, from tall oil or its soaps including crude floating soap; crude tall oil; distilled tall oil; or tall oil or its soaps purified by solvent extraction, by alkali brine extraction, and/or by high temperature steam treatment of the anhydrous tall oil soap; or in the broader sense from any composition containing higher fatty acids or their esters whether or not purified by these pretreatments.

It is possible to prepare relatively pure products by the process of this invention, which products may be used for various purposes in the form of the individual constituents of the composition or admixtures thereof. The essential products, higher fatty acids or their derivatives, with or without additional treatments, are advantageously converted to soaps with or without the other acids and materials present in the original mixture.

The preferred process of the invention, in general, is to dissolve the fatty acid composition in a solvent such as benzine, petroleum ether, kerosene, naphtha, or the individual saturated aliphatic hydrocarbons such as straight or branched chain butane, pentane, hexane, heptane, octane, nonane, decane, and the higher homologues. This solution is preferably in the proportion of one part of fatty acid material to about two or more parts of solvent. When the solution has been completed, it is then freed from any insoluble matter by filtration, centrifugation, and/or decantation with or without filter-aids such as filter clay, kieselguhr, silica gel and/or adsorbent carbon. This solution may be dried with a suitable agent such as solid sodium chloride in order to remove any water which may interfere with the proper recovery of solvents. The next step is to treat the aliphatic hydrocarbon solution of fatty acid material with liquid sulphur dioxide. At a reduced temperature the liquid sulphur dioxide will separate from the hydrocarbon solution and form an immiscible layer which contains the major proportion of odoriferous impurities, coloring matter and those bodies which are potentially colored. The extraction may be repeated several times in order to insure a substantially complete removal of the undesired constituents. Although any quantity of liquid sulphur dioxide will have a desirable effect, it is preferred to use at least half as much liquid sulphur dioxide as there is hydrocarbon solvent.

The solution of fatty acid material in hydrocarbon solvent and the liquid sulphur dioxide are miscible when under pressure and at temperatures well above the normal boiling point of liquid sulphur dioxide. Under these conditions it is possible to intimately and thoroughly mix the solvent. If the mixture is then cooled, for example, to about $-10°$ C., and allowed to separate into phases, a supernatant solution of cleaned fatty acid material is obtained. The lower sulphur dioxide layer will contain the dark-colored or unstable impurities in the oil.

In preparing the hydrocarbon solution of the fatty acid material it is advantageous to operate at atmospheric or slightly higher temperatures in order to obtain rapid dissolution. The solution is preferably dried before the subsequent purification steps are performed. The solution advantageously may be chilled to a low temperature in order to separate the less soluble constituents of the composition from the solution, which may then be removed. The degree of cooling at this point may even be lower than the temperature of treatment with the liquid sulphur dioxide. The final temperature of treatment with the liquid sulphur dioxide may be at any point at which immiscible layers are formed but for maximum selectivity the temperature should be as low as permissible, for example temperatures as low as $-35°$ C. may be used. It should be noted at this point that it is also within the scope of this invention to dissolve the fatty acid material in liquid sulphur dioxide and to extract the solution thereof with an immiscible solvent, for example a liquid aliphatic hydrocarbon.

After separation of the raffinate and extract layers, the hydrocarbon and retained liquid sulphur dioxide may be separated from the raffinate layer by distillation. Then further purification of the raffinate may be accomplished by contact clay treatment as with Tonsil clay or my conventional, simple filtration through fuller's earth. This treatment leaves a lighter colored material substantially free from potential color bodies and objectionable odors. The liquid sulphur dioxide solution or extract layer may be re-extracted one or more times with a liquid hydrocarbon or other immiscible solvent to recover as much of the desirable fatty acid material as is possible. The solvent sulphur dioxide contained in the residual extraction layer is then recovered for further use, preferably by raising the temperature and by releasing the pressure on the solution. The extraction proper is a bad smelling, dark colored oil, considerably higher in specific gravity than the raffinate and also higher in viscosity.

The preferred raw material, tall oil, is a by-product from the alkaline processes for the production of paper pulp. Although the constitution of tall oil is not fixed, it generally contains about 90% of organic acids, and about 10% of unsaponifiable material. The composition of various constituents of the oil is very complex, and the exact chemical structure thereof is not known. The product as obtained directly from the so-called black liquor is in saponified form, that is, the acids exist as sodium salts; and both this product and the acid product obtained by treating the saponified product with an acid, such as sulphuric acid and/or sulphur dioxide gas, have an objectionable odor, are dark in color, and further darken on aging.

In accordance with the present invention the tall oil, with or without pretreatment, is contacted with liquid sulphur dioxide, thereby precipitating the dark-colored constituents in a separate layer and leaving a lighter colored material suitable for the preparation of fatty acid soaps. The tall oil is preferably dissolved in a solvent, particularly a hydrocarbon solvent, of which the preferred type is benzine or other saturated aliphatic hydrocarbon. The liquid sulphur dioxide is then contacted with the solution. It is also possible to treat with other agents before, after or during the treatment with liquid sulphur dioxide. The benzine layer of the preferred product may then be separated from the dark colored residue in liquid sulphur dioxide. When the tall oil is first dissolved in benzine in the proportion of one part tall oil to about two or more parts of benzine, a brown fibrous precipitate may be formed which appears to be a lignin-like material. This precipitate may be separated by decanting, centrifuging, and/or filtering.

The tall oil, or other fatty acid composition, before or after the extraction and/or other treatments, may also be subjected to the various purification treatments and other procedures set out in detail in the copending application Serial Number 283,861, filed on July 11, 1939, in the name of Emil Edward Dreger. The process described therein includes the treatment of the anhydrous neutralized oil with steam, in an inert atmosphere and at a temperature above the melting point of the anhydrous soap. The soap products obtained from such treatments are harder, are free from objectionable odor, and are substantially free from unsaponifiable material. The fatty acids which may be liberated from the soaps have a considerably lower iodine number and higher viscosity, indicating a change in the constitution thereof. The unsaponifiable material which is separated may be used in the preparation of detergent and like materials by the treatment thereof, preferably in a solvent, with a sulphonating agent.

It is often desired to substantially separate the tall oil into its constituents, thus recovering the fatty acids substantially free from resinous material, in which form the acids are far more valuable and have greater utility than the original mixtures thereof. The separated fatty acids can be used for preparing high grade soap or even edible products. The separation of the ingredients is readily effected by fractional distillation of the acids obtained from the tall oil soaps which have been treated to remove the non-saponifiable materials by the process described in the said Dreger application Serial Number 283,861. The absence of the non-saponifiables which have a very broad boiling range renders the separation of the fatty acids by distillation more efficient. The material, however, may be fractionally distilled at any point in the process in order to separate the fatty acids from the other acidic constituents. The material may also be fractionally separated by one or more fractional crystallizations from acetone or similar solvents.

The tall oil may be lightened in color by distilling, hydrogenating, and/or by bleaching with chlorine, hypochlorite or air at any time during the treatment of the tall oil in order to improve the final products.

The invention will be further illustrated by the following specific examples, although it is not limited thereto.

*Example I*

100 parts by volume of distilled oil are mixed with 200 parts by volume of a hexane petroleum fraction and the mixed solution is then filtered to remove any insoluble matter. The tall oil solution is then intimately contacted with an equal volume of liquid sulphur dioxide at a temperature of about —10° C. The mixed solutions are then permitted to stand and two layers separate. The lower layer of liquid sulphur dioxide contains the darker colored, more viscous and denser constituents of the tall oil. The extraction with liquid sulphur dioxide is repeated. The hydrocarbon solution contains the major portion of the original tall oil. The hydrocarbon solvent and retained sulphur dioxide are removed and the tall oil heated with Tonsil clay and filtered. The product is a bright, clear, odorless oil.

*Example II*

500 parts by weight of distilled tall oil are dissolved in 1080 parts by volume of a hexane petroleum fraction and permitted to stand for several hours. About 45 parts of filter-aid are added to the solution after which it is cooled to —30° C. and filtered through a chilled Buchner funnel. The filtrate is then extracted with about an equal volume of liquid sulphur dioxide to leave a light colored oil solution. The solvent and residual sulphur dioxide are removed and the oil is contacted with 5% Tonsil clay at about 275° F. and then filtered. The product is light colored and free from objectionable odor.

*Example III*

100 parts by weight of crude dry tall oil are dissolved in 500 parts by volume of a hexane petroleum fraction and filtered to remove a brownish precipitate of about 0.3 part by weight. The filtrate, deep red in color, is extracted at about —5° to —10° C. with liquid sulphur dioxide, using a quantity which gives approximately 50 parts by volume of extract. This first extract is very dark in color and on evaporation of the sulphur dioxide leaves about 6 parts by weight of very dark material. Additional extractions (about 5) yield extracts which are red in color but grow progressively lighter with each extraction. Removal of the solvent from these extracts leaves approximately 2 parts by weight of extract in each case. Distillation of the hydrocarbon and retained sulphur dioxide from the extracted layer leaves about 84 parts by weight of refined tall oil lighter in color than the original material.

Although the above specific examples indicate a batch procedure, it is also possible to conduct the entire process in a continuous manner as described in the following example and shown in the attached flow sheet drawing:

*Example IV*

A portion of a fatty acid composition such as tall oil held in tank 1 is continuously mixed with a solvent such as three volumes of benzine from tank 2, continuously dried and filtered with filter aid through filter 3. This solution is then pre-cooled indirectly with the previously extracted benzine solution in heat exchanger 4, cooled additionally by indirect contact with liquid sulphur dioxide in heat exhanger 5 and then passed in countercurrent flow to about an equal volume of pre-cooled liquid sulphur dioxide or a solution containing a major proportion of liquid sulphur dioxide in a suitable vertical tower or column 6. The liquid sulphur dioxide from tank 7 is pre-cooled in heat exchanger 8 and in sulphur dioxide cooler 9 by direct evaporation and is then usually introduced at the top of column 6. The solution containing liquid sulphur dioxide and impurities is removed at the bottom of column 6 with suitable separating means. The cold solution of fatty acid material in hydrocarbon solvent is introduced at the bottom of column 6 and removed at the top thereof in a purified state. The cold extracted hydrocarbon solution is then passed in indirect heat exchange in heat exchanger 4 with the incoming hydrocarbon solution of fatty acid materials in order to pre-cool the latter. The liquid sulphur dioxide extract is in turn extracted in a column or tower 10 with fresh hydrocarbon solvent from tank 2 which solvent has been pre-cooled in chiller 11 and brought to extraction temperature by cooler 12. In this cooler 12 vaporizing liquid sulphur dioxide is used as the refrigerant. The liquid sulphur dioxide extract is then passed in indirect heat exchange in sulphur dioxide precooler 8 with the liquid sulphur dioxide from tank 7 used for extracting in the first reaction chamber 6. The liquid sulphur dioxide extract is then passed through a suitable system for separating and recovering the liquid sulphur dioxide and the extract. The hydrocarbon extract from the second stage of extraction 10 is passed in indirect heat exchange in chiller 11 with the hydrocarbon for the second stage extraction 10, and this extract material as well as the hydrocarbon solution from the first extraction stage 6, individually or together, are passed through a recovery system for separating the hydrocarbon and the purified product. The fatty acid products recovered from the hydrocarbon solution may then be directly neutralized to form the soap or they may be further treated as described hereinbefore. The counter-current extraction, not only of the liquid sulphur dioxide extract but also of the hydrocarbon solution, may be continuously conducted in one or more units. The hydrocarbon solvent and the liquid sulphur dioxide used as an extractant as well as that employed as a refrigerant may be recovered individually and be re-used in the process. It is not essential that the hydrocarbon solvent be freed completely of the sulphur dioxide or that the liquid sulphur dioxide be completely separated from the hydrocarbon when re-used in the process.

It is possible to add other organic acid materials to the tall oil at any point during the process or similarly to treat other fatty acid materials alone or in other mixtures. For example, various oils, fats, waxes, fatty acids, rosin, and other resins may be added to the tall oil before any processing has been effected to remove various impurities which they may contain. Suitable agents which may be so treated alone or added to the tall oil before treatment are wool fat, certain grades of garbage grease, whale oil and fish oils including salmon oil, menhaden oil and shark oil, spermaceti, tallow, coconut oil, olive oil, oxidized petroleum, cottonseed oil, cottonseed oil foots, linseed oil, China-wood oil, oiticica oil, soya bean oil, palm oil, palm nut oil, montan wax, carnauba wax, Japan wax, Chinese wax, tung oil, rape seed oil, peanut oil, sunflower oil, castor oil, babassu nut oil, corn oil, sesame oil, cocoa butter, cashew nut oil, cashew nut shell oil, the corresponding individual fatty acids in these oils, or mixtures of any of the above listed fatty acids, fats, fatty oils, fatty acid esters, and waxes. The temperature and pressure employed will depend somewhat on the material being treated.

The new compositions in the form of their alkali metal, ammonia and/or amine soaps may be used in combination with any of the common auxiliary agents used in soap and detergent compositions. Suitable addition agents are other emulsifying agents including long-chain alcohol sulphate salts, monoglyceride monosulphate salts, salts of sulphonated mineral oil extracts, Turkey red oil, lecithin, mono-, di-, and tri-ethanolamines and glycerolamines, and their soaps; alkaline soap builders such as borax, soda ash, trisodium phosphates, and sodium silicates; the water-soluble, water-softening phosphorus compounds of the type of tetraphosphoric, pyrophosphoric or hexamethaphosphoric acid and their alkali metal; ammonia, and certain amine salts or alkyl esters; methyl and ethyl cellulose; coloring matter such as dyes, lakes and pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl, alcohol, phenol, cyclohexanol, water, tetralin, decalin, pine oil, mineral oil, mineral oil extracts, and naphtha; perfumes and deodorants; fats, oils, fatty acids, monoglycerides, waxes, gums, glue and resins; germicides such as phenol and organic or inorganic mercury compounds; and/or any of the common water-soluble salts. The ingredients may be incorporated into the soap by milling, stirring, kneading, crutching, fusing, and/or drying by rolls or by spray of mixed solutions.

Where, in this specification and the appended claims, reference is made to tall oil, it is understood that it refers to that product which is obtained as a by-product from the processing of wood to produce paper pulp which product consists of a mixture of fatty acids and other organic acids, unsaponifiable material and impurities, whether produced by the sulphate, sulphite, soda or other processes, and whether distilled or not; and where reference is made to saponified tall oil, it is understood that it is to such a product in saponified form, whether obtained by saponifying tall oil, or in the crude form which is directly separated from the liquors of the paper making process without acidification to produce the tall oil.

It will thus be seen that by the present invention there are provided a process for the production of organic acids, soaps, and soap-like detergents, as well as non-acid material adapted for the production of sulphonated detergents, of commercially satisfactory qualities from the products obtained as the by-products from the alkaline processes for the production of paper pulp, and also, as new products, the improved acids, soaps or soap-like detergents and improved unsaponifiable products.

As many widely different embodiments of the invention may be made without departing from the spirit and scope thereof, it is to be understood that the application is not limited to the specific proportions or embodiments thereof except as defined in the following claims.

I claim:

1. The process of improving dark-colored higher fatty acids which comprises dissolving a dark-colored higher fatty acid in a substantially saturated liquid aliphatic hydrocarbon having at least four carbon atoms in the proportion of at least 2 parts of solvent to 1 of higher fatty acid, and extracting the hydrocarbon solution at a temperature not greater than about −5° C. with liquid sulphur dioxide to yield a hydrocarbon solution of purified lighter-colored higher fatty acid and a liquid sulphur dioxide solution of dark-colored and unstable constituents.

2. The process of improving dark-colored tall oil which comprises dissolving a dark-colored tall oil in a substantially saturated liquid aliphatic hydrocarbon having at least four carbon atoms in the proportion of at least 3 parts of solvent to 1 of tall oil, filtering the hydrocarbon solution to remove material insoluble therein, and extracting the hydrocarbon solution at a temperature not greater than about −5° C. with liquid sulphur dioxide to yield a hydrocarbon solution of purified lighter-colored tall oil and a liquid sulphur dioxide solution of dark-colored and unstable constituents, separating the solutions and treating the purified tall oil with silica gel.

3. The process of improving dark-colored tall oil which comprises dissolving a dark-colored tall oil in a substantially saturated liquid aliphatic hydrocarbon having at least four carbon atoms in the proportion of at least 2 parts of hydrocarbon solvent to 1 part of tall oil, and extracting the hydrocarbon solution at a temperature not greater than about −5° C. with liquid sulphur dioxide to yield a hydrocarbon solution of purified lighter-colored tall oil and a liquid sulphur dioxide solution of dark-colored and unstable constituents.

4. The process of improving dark-colored higher fatty acids which comprises dissolving a dark-colored higher fatty acid in a substantially saturated liquid aliphatic hydrocarbon having at least four carbon atoms in the proportion of at least 3 parts of hydrocarbon solvent to 1 part of higher fatty acid, separating any material insoluble in the hydrocarbon solution, and countercurrently extracting the solution at a temperature not greater than about −5° C. with liquid sulphur dioxide to yield a hydrocarbon solution of purified lighter-colored fatty acid and a liquid sulphur dioxide solution of dark-colored and unstable constituents.

5. The process which comprises mixing liquid sulphur dioxide, dark-colored tall oil, and at least double the quantity of tall oil of a substantially saturated liquid aliphatic hydrocarbon having at least four carbon atoms under pressure and at a temperature at which a single liquid phase is formed, cooling the mixture to a temperature not greater than about −5° C. at which a liquid sulphur dioxide solution of dark-colored constituents separates from the hydrocarbon solution of purified tall oil, and separating the solutions.

ROBERT LOUIS BRANDT.

CERTIFICATE OF CORRECTION.

Patent No. 2,308,431.  January 12, 1943.

ROBERT LOUIS BRANDT.

It is hereby certified that error appears in the printed specification of the above numbered patent requiring correction as follows: Page 2, first column, line 37, strike out the period after "solvent" and insert instead a comma; and second column, line 33, after "distilled" insert --tall--; page 3, second column, line 61, strike out the comma after "furyl"; and that the said Letters Patent should be read with this correction therein that the same may conform to the record of the case in the Patent Office.

Signed and sealed this 23rd day of February, A. D. 1943.

Henry Van Arsdale,
Acting Commissioner of Patents.

(Seal)